United States Patent [19]

Richie, deceased et al.

[11] Patent Number: 5,212,249

[45] Date of Patent: May 18, 1993

[54] METHOD FOR PREPARING ASYMMETRIC RADIAL POLYMERS

[75] Inventors: Gary W. Richie, deceased, late of Columbus, by Jean Richie, administrator; Raymond C. Tsiang, Sugar Land; Ronald J. Hoxmeier; Arthur R. Bean, both of Houston; Harvey E. Atwood, Kingwood, all of Tex.

[73] Assignee: Shell Oil Company, Houston, Tex.

[21] Appl. No.: 783,441

[22] Filed: Oct. 28, 1991

[51] Int. Cl.$^5$ ............................................. C08F 297/04
[52] U.S. Cl. .................... 525/258; 525/102; 525/105; 525/106; 525/250; 525/267; 525/271; 525/276; 525/288
[58] Field of Search ............... 525/98, 250, 258, 259, 525/276, 288, 267, 271

[56] References Cited

U.S. PATENT DOCUMENTS

| | | | |
|---|---|---|---|
| 3,281,383 | 10/1966 | Zelinski et al. | 260/23.7 |
| 3,852,623 | 7/1974 | LaFlair | 260/879 |
| 4,089,824 | 5/1978 | Bronstert et al. | 260/27 |
| 4,091,198 | 5/1978 | Smith et al. | 526/178 |
| 4,096,203 | 6/1978 | St. Clair | 260/876 B |
| 4,145,498 | 3/1979 | Farrar | 526/178 |
| 4,153,647 | 5/1979 | Glukhovskoi et al. | 260/880 R |
| 4,248,986 | 2/1981 | Lal et al. | 525/359 |
| 4,311,803 | 1/1982 | Smith et al. | 525/53 |
| 4,370,433 | 1/1983 | Allison, III et al. | 524/274 |
| 4,373,055 | 2/1983 | Haaf et al. | 524/505 |
| 4,391,949 | 7/1983 | St. Clair | 525/99 |
| 4,397,994 | 8/1983 | Takeuchi et al. | 525/332.3 |
| 4,405,754 | 9/1983 | Moczygemba et al. | 525/102 |
| 4,444,953 | 4/1984 | St. Clair | 525/98 |
| 4,482,677 | 11/1984 | Teranaka et al. | 525/250 |
| 4,639,494 | 1/1987 | Imai et al. | 525/271 |
| 4,710,554 | 12/1987 | Imai et al. | 526/180 |
| 4,734,461 | 3/1988 | Roggero et al. | 525/293 |
| 4,845,165 | 7/1989 | Halasa et al. | 526/78 |

FOREIGN PATENT DOCUMENTS

| | | |
|---|---|---|
| 0207562 | 6/1986 | European Pat. Off. . |
| 0314256 | 10/1988 | European Pat. Off. . |
| 0312928 | 4/1989 | European Pat. Off. . |
| 63-248817 | 4/1987 | Japan . |

*Primary Examiner*—Jacob Ziegler

[57] ABSTRACT

A method for preparing asymmetric radial polymers wherein the different polymeric arms are contacted sequentially with a nonpolymerizable coupling agent. Contacting of the final step in the process, which frequently but not necessarily always will be the second step in the process, will be carried out in the presence of a polar compound suitable for increasing the amount of vinyl content in a conjugated diolefin polymer during polymerization thereof. The method used narrows the relative arm distribution of the several asymmetric radial polymers produced and significantly increases the amount of total product having the desired ratio of polymeric arms and accomplishes this objective in relatively short reaction time. Any nonpolymerizable coupling agent known in the prior art to be useful in the production of asymmetric radial polymers may be used in the method of this invention but nonpolymerizable coupling agents having from 3 to about 12 functional groups are most effective and nonpolymerizable coupling agents having 2 or 3 functional groups are most preferred. Useful polar compounds are, generally, selected from the group consisting of ethers, tertiary amines, pyridine and pyrolidene compounds.

12 Claims, No Drawings

METHOD FOR PREPARING ASYMMETRIC RADIAL POLYMERS

BACKGROUND OF THE INVENTION

1. Field of the Invention

This invention relates to a method for preparing polymers. More particularly, this invention relates to a method for preparing asymmetric radial polymers.

2. Prior Art

Heretofore, several methods have been proposed for preparing asymmetric radial polymers. As is well known in the prior art, radial polymers comprise three or more arms extending outwardly from a nucleus. The asymmetric radial polymers, generally, contain arms of at least two different polymers, which polymers may vary as to chemical composition, structure and/or molecular weight. A principal difference in the method frequently used to prepare asymmetric polymers resides in the selection of a coupling agent which forms the nucleus of the radial polymer. The coupling agent may contain a fixed, though sometimes variable, number of functional sites such as the coupling agents taught in U.S. Pat. Nos. 3,281,383; 3,598,884; 3,639,517; 3,646,161; 3,993,613 and 4,086,298 or the coupling agent may itself be a monomer which polymerizes during the coupling reaction such as taught, for example, in U.S. Pat. No. 3,985,830.

In general, and when an asymmetric polymer is prepared using one of the methods heretofore proposed, a blend of polymeric arms is first prepared containing the various polymeric arms in the desired ratio and the blend of polymeric arms is then added to the coupling agent or the coupling agent is added to the blend of polymeric arms. These methods do, then, result in the production of a product having, on average, the desired number of each kind of arm in the asymmetric polymer. The real problem associated with producing asymmetric polymers in this fashion, however, is that the product obtained is in actuality a statistical distribution of all possible products.

Recently, it has been discovered that a more uniform asymmetric polymer can be produced by combining the arms and a nonpolymerizable coupling agent sequentially. This process takes advantage of the fact that the first arms combined with the coupling agent will react with the next most active sites on the coupling agent and so forth. Such a process is taught in copending U.S. patent application Ser. No. 07/593,378. One disadvantage of this process is that the last arms to couple with the coupling agent; i.e., those arms which couple with the least reactive of the coupling agent sites proceed very slowly and it may take even hours to complete the preparation of the asymmetric polymer. The need, then, for a method to expedite the coupling reaction to completion when preparing a relatively uniform asymmetric polymer is believed to be readily apparent.

SUMMARY OF THE INVENTION

It has now been discovered that the foregoing and other disadvantages of the prior art processes for preparing asymmetric polymers can be avoided or at least significantly reduced with the method for preparing asymmetric radial polymers of this invention and an improved process for preparing asymmetric radial polymers provided thereby. It is, therefore, an object of this invention to provide an improved process for preparing asymmetric radial polymers. It is another object of this invention to provide such an improved process wherein the relative distribution of arms within the polymer is controlled within a relatively narrow range. It is another object of this invention to provide such an improved process wherein the coupling of the different arms in the asymmetric polymer can be completed in a relatively short period of time. The foregoing and other objects and advantages will become apparent from the description of the invention set forth hereinafter and from the examples included therein.

In accordance with the present invention, the foregoing and other objects and advantages are accomplished in a process wherein the different arms to be contained in the asymmetric radial polymer are contacted sequentially with the coupling agent and a suitable polar compound is added immediately prior to, or subsequent to the time the last arm in the sequence are contacted with the nonpolymerizable coupling agent. Generally, the coupling sequence will be controlled by the relative number of each arm sought in the final product with that polymer intended to provide the greater number of arms contacted with the coupling agent first, that polymer intended to provide the next greatest number of arms contacted with the coupling agent second, that polymer intended to provide still the next greatest number of arms contacted with the coupling agent third and so forth. To the extent that all or some of the polymer arms are intended to be present in the asymmetric radial polymer product in equal numbers the order of addition of these arms is immaterial.

DETAILED DESCRIPTION OF THE INVENTION

As indicated supra, the present invention is drawn to an improved process for making asymmetric radial polymers. As also indicated supra, asymmetric radial polymers contain a plurality (three or more) of arms of at least two different polymers. The polymeric arms may differ as to chemical composition, structure and/or molecular weight. In the process of the present invention, the different arms are contacted sequentially with a nonpolymerizable coupling agent and a suitable polar compound is added at some point during the last coupling reaction. When the number of arms of one polymer is intended to be present in the asymmetric radial polymer product in a greater number than one or more other polymer arms, the polymer intended to be present in the greater number will be contacted with the nonpolymerizable coupling agent first. The polymer intended to be present in the next greater number will be contacted with the nonpolymerizable coupling agent next and the polymer intended to be present in the least number will be contacted with the nonpolymerizable coupling agent last and the suitable polar compound will be added at some point during the coupling of this last polymer arm. It will of course be appreciated that the polymer intended to provide any number of arms in the asymmetric polymer product could itself be a mixture of different polymers. After reaction of the arms intended to be present in the greater number with the coupling agent is complete or at least substantially complete, the product therefrom will be contacted with the arm intended to be present in the next greatest number and this reaction allowed to proceed until complete or at least substantially complete and this process will be continued until the last polymeric arm is contacted with the contacting agent. When two or more arms are intended to be present in equal number, the order of contacting of these arms with the coupling agent is not critical and each of these arms may be added in any order (sequence).

In general, the method of this invention may be used to prepare asymmetric radial polymers with any polymer containing a reactive end group which will react with one or more functional groups contained in a selected nonpolymerizable coupling agent. The method is particularly suitable for the preparation of asymmetric radial polymers from so-called "living" polymers containing a single terminal metal ion. The nonpolymerizable coupling agent used in the preparation must, then, contain at least three functional groups which will react with the polymer at the site of the metal ion. As is well known in the prior art, "living" polymers are polymers containing at least one active group such as a metal atom bonded directly to a carbon atom. "Living" polymers are readily prepared via anionic polymerization. Since the present invention is particularly well suited to the preparation of asymmetric radial polymers using "living" polymers to form the arms thereof, the invention will be described by reference to such polymers. It will, however, be appreciated that the invention would be equally useful with polymers having different reactive groups so long as the selected nonpolymerizable coupling agent contains functional groups which are reactive with the reactive site contained in the polymer.

"Living" polymers containing a single terminal group are, of course, well known in the prior art. Methods for preparing such polymers are taught, for example, in U.S. Pat. Nos. 3,150,209; 3,496,154; 3,498,960; 4,145,298 and 4,238,202, the disclosure of which patents are herein incorporated by reference. Methods for preparing block copolymers which may be used in the method of the present invention are taught, for example, in U.S. Pat. Nos. 3,231,635; 3,265,765 and 3,322,865, the disclosure of which patents are also herein incorporated by reference. In general, the polymers produced with the processes taught in the foregoing patents may be polymers of one or more conjugated dienes containing from about 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like, preferably those conjugated diolefins containing from about 4 to about 8 carbon atoms are used. In accordance with the disclosure of at least certain of these patents, one or more of the hydrogen atoms in the conjugated diolefins may be substituted with halogen. The polymers produced by these processes may also be copolymers of one or more of the aforementioned conjugated diolefins and one or more other monomers particularly monoalkenyl aromatic hydrocarbon monomers such as styrene, various alkyl substituted styrenes, alkoxy substituted styrenes, vinyl naphthalene and the like. Homopolymers and copolymers of monoalkenyl aromatic hydrocarbons, which polymers are also useful in the present invention, can be prepared by the method taught in the forementioned patents, particularly the methods taught in U.S. Pat. Nos. 3,150,209; 3,496,154; 3,498,960; 4,145,298 and 4,238,202. When the polymer product is a random or tapered copolymer, the polymers are, generally, added at the same time, although the faster reacting monomer may be added slowly in some cases, while when the product is a block copolymer, the monomer used to form the separate blocks are added sequentially.

In general, the polymers useful as arms in the method of this invention may be prepared by contacting the monomer or monomers with an organo alkali metal compound in a suitable solvent at a temperature within the range from about $-150°$ C. to about $300°$ C., preferably at a temperature within the range from about $0°$ C. to about $100°$ C. Particularly effective polymerization initiators are organo lithium compounds having the general formula:

RLi wherein,
R is an aliphatic, cycloaliphatic, alkyl substituted cycloaliphatic, aromatic or alkyl substituted aromatic hydrocarbon radical having from about 1 to about 20 carbon atoms, and Li is lithium.

In general, the polymers useful as arms in the method of this invention will have a weight average molecular weight within the range from about 1,000 to about 500,000 and when the polymer is a copolymer of one or more conjugated diolefins and one or more other monomers, the copolymer will comprise from about 1 weight percent to about 99 weight percent monomeric diolefin units and from about 99 weight percent to about 1 weight percent other monomer units. In general, the different polymer arms will be prepared separately and maintained separately until each is sequentially contacted with the nonpolymerizable coupling agent. When a block copolymer is used, the weight-average molecular weight of the conjugated diolefin block will range from about 1000 to about 500,000 and the weight average molecular weight of the other monomer block will be within the range from about 1000 to about 500,000.

In general, any of the nonpolymerizing coupling agents known in the prior art to be useful in forming a radial polymer by contacting the same with a living polymer may be used in the method of this invention. In general, suitable nonpolymerizable coupling agents will contain three or more functional groups which will react with the "living" polymer at the metal-carbon bond. While the method of the present invention, will, theoretically, at least, improve the relative distribution of different arms in an asymmetric radial polymer having any number of arms, the method offers significant improvement when the coupling agent contains from 3 to about 12 functional groups reactive with the metal-carbon bond of the living polymer. Representative coupling agents include, but are not limited to $SiX_4$, $RSiX_3$, $HSiX_3$, $X_3Si—SiX_3$, $X_3Si—O—SiX_3$, $X_3Si—(CH_2)_x—SiX_3$, $R—C(SiX_3)_3$, $R—C(CH_2SiX_3)_3$, $C(CH_2SiX_3)_4$ and the like, particularly those containing from 3 to about 6 functional groups. In the foregoing formulae; each upper case X may, independently, be fluorine, chlorine, bromine, iodine, alkoxide radicals, carboxylate radicals, hydride and the like, R is a hydrocarbon radical having from 1 to about 10 carbon atoms, preferably from 1 to about 6 carbon atoms; and x is a whole number from 1 to about 6. Particularly useful coupling agents include the silicon tetrahalides such as silicon tetrafluoride, silicon tetrachloride, silicon tetrabromide and the like.

In general, the "living" polymers used as arms in the asymmetric radial polymer prepared with the method of this invention will be contacted with the nonpolymerizable coupling agent at a temperature within the range from about $0°$ C. to about $100°$ C. at a pressure within the range from about 0 psig to about 100 psig and the contacting in each step will be maintained until reaction between the arms and the nonpolymerizable coupling agent is complete or at least substantially complete, generally for a period of time within the range from about 1 to about 120 minutes. While the inventor does not wish to be bound by any particular theory it is believed that the method of this invention results in an improved relative arm distribution because the reactivity of the functional groups contained in the nonpolymerizable coupling agent become progressively less active as the number of functional groups contained in the nonpolymerizable coupling agent is reduced as the result of reaction with a metal carbon bond contained in the "living" polymer. The slow reaction of the last functional groups in the non-polymerizable coupling agent are then accelerated by the addition of a suitable polar compound. This reduced activity is, of course, believed to be caused primarily by steric hindrance resulting from the progress of incorporation of polymer segments onto the nonpolymerizable coupling agent. The last functional site on each atom bearing functional groups remaining on the nonpolymerizable coupling agent would, then, be the least reactive no matter how many functional groups the nonpolymerizable coupling agent initially contained and the reactivity of this last coupling site can be significantly improved by the addition of a suitable polar compound. It will, of course, be appreciated that when only a portion of the total number of arms to be contained in the asymmetric radial polymer is initially contacted with the nonpolymerizable coupling agent, the arms would have readier access to the more reactive functional groups and would, then, react predominately at these groups. Similarly, the next portion of the arms contacted with the partially reacted nonpolymerizable coupling agent would again be more likely to react with the next most reactive of the remaining functional groups and this progression would continue until such time as all of the functional groups were reacted. This difference in reactivity, then, when coupled with sequential addition of the different arms greatly enhances the probability that each asymmetric radial polymer formed will have the desired number of each arm. The method of the present invention is particularly useful for the production of an asymmetric polymer wherein a single arm of a particular polymer on each atom bearing functional groups is desired. This arm would, then, be contacted last and would then react with the least reactive, except for the addition of the polar compound, of the functional groups in the nonpolymerizable coupling agent.

In general, the polymers useful as arms in the asymmetric radial polymer produced by the method of this invention will be in solution when contacted with the nonpolymerizable coupling agent. Suitable solvents include those useful in the solution polymerization of the polymer and include aliphatic, cycloaliphatic, alkyl substituted cycloaliphatic, aromatic and alkyl substituted aromatic hydrocarbons and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methyl cyclohexane, methyl cycloheptane and the like, aromatic hydrocarbons such as benzene and alkyl-substituted aromatic hydrocarbons such as toluene, xylene and the like. Since the polymer useful in making the asymmetric radial polymer with the method of this invention will contain a single terminal reactive group on each atom bearing functional groups, the polymers used in preparation of the asymmetric radial polymer will be retained in solution after preparation without deactivating the reactive living site. In general, the coupling agent may be added to a solution of the polymer or a solution of the polymer may be added to the coupling agent. In general, the polymer content during coupling will range from about 1% to about 30 wt %, based on total solution. interestingly, the microstructure of the polymeric arms will not change in the process of this invention since polymerization of the polymeric arms is complete prior to the coupling reaction.

In general, any polar compound known to be suitable for increasing the vinyl content in diolefin polymers will be suitable to increase the activity of the later reacting sites of the nonpolymerizable coupling agent used in the process of this invention. Suitable polar compounds include the lewis bases. Suitable polar compounds, then, include the ethers such as diethyl ether, dibutyl ether, tetrahydrofuran, ethylene glycol dimethyl ether, ethylene glycol dibutyl ether, diethylene glycol dimethyl ether, diethylene glycol dibutyl ether, dioxane, triethylene glycol ether, 1,2-dimethoxybenzene, 1,2,3-trimethoxybenzene, 1,2,4-trimethoxybenzene, 1,2,3-triethoxybenzene, 1,2,3-tributoxybenzene, 1,2,4-triethoxybenzene and the like. Suitable polar compounds also include tertiary amines such as triethyl amine, tributyl amine, N,N,N',N'-tetramethyl ethylene diamine and the like. Suitable polar compounds include various pyridine and pyrolidine compounds such as dipipyridinoethane, dipyrolidinoethane and the like.

In general, the suitable polar compound will be used at a concentration within the range from about 0.1 to about 20% by wt for the monoethers and from about 10 to about 1000 ppm for the di-and polyethers and for the amines.

The method of preparing the asymmetric radial polymers of this invention will comprise a plurality of steps. In the first step, a polymer containing a single terminal reactive group will be contacted with a nonpolymerizable coupling agent containing a plurality of functional groups which are reactive with the terminal group of the polymer. After initial contacting, the polymer and nonpolymerizable coupling agent will continue to be contacted for a sufficient period of time to permit complete or at least substantially complete reaction with the nonpolymerizable coupling agent and the polymer. In a second or subsequent step, the reaction product from the previous step will be combined with a solution of a polymer which is different from the polymer used in the previous steps. The difference in polymer may be in chemical composition including relative chemical composition, structure, molecular weight or the like. In the second or subsequent step contacting between the polymer and the reaction product from the previous step will be continued until reaction between the polymer and functional groups of the nonpolymerizable coupling agent is complete or at least substantially complete. In all except the last step of the preparation it will be important to control the amount of polymer contacting with the nonpolymerizable coupling agent such that, on average, the desired number of such arms are incorporated into the nucleus of each of the asymmetric radial polymers actually formed. In the final step, careful control of the amount of polymer used in not as important so long as a sufficient amount of polymer to react with all of the remaining functional groups in the coupling agent is used. In fact, a small excess of the last polymer will frequently be used to enhance the coupling reaction rate with this polymer. To the extent that the polymer used is not readily separable from the asymmetric radial polymer, however, and to the extent that the presence of such a polymer in the final product is undesirable, care should be exercised to ensure that a stochiometric amount of the last polymer relative to the remaining functional groups, is used.

In general, the polar compound may be added at any point after the first coupling reaction is complete or during the last coupling reaction although maximum advantage will be realized when the polar compound is added at the beginning of the last step. Addition of the polar compound immediately prior to or at the beginning of the last coupling step is, therefore, preferred.

The asymmetric radial polymers of this invention may be used in any of the applications for which asymmetric radial polymers having the same average relative arm structure can be used. Suitable enduse applications, then, include impact modification of engineering themoplastics, impact modification of unsaturated thermosetting polyesters, adhesives and the like. The asymmetric polymer may also be used to prepare a high impact polystyrene or a high gloss, high impact polystyrene.

PREFERRED EMBODIMENT

In a preferred embodiment of the present invention, the process of this invention will be used to prepare an asymmetric radial polymer having a total of three or four arms of two different polymers in a two step process. In the preferred embodiment, one arm will be a polymer containing only conjugated diolefins and the other arm will be a block copolymer comprising at least one block of a conjugated diolefin polymer and at least one block of another monomer useful in preparing living polymers. In a most preferred embodiment, the other monomer will be a monoalkenyl aromatic hydrocarbon. In a still more preferred embodiment, the conjugated diolefin polymer will be a homopolymer of either butadiene or isoprene and the block copolymer will comprise at least one block of a conjugated diolefin homopolymer and at least one other block of the block copolymer will be homopolymers of polystyrene. In the preferred embodiments, the conjugated diolefin polymers will have a weight average molecular weight within the range from about 10,000 to about 100,000 and the block copolymers will comprise conjugated diolefin polymer blocks having a weight average molecular weight within the range from about 10,000 to about 100,000 and the weight average molecular weight of the polymer block prepared with the other monomer will be within the range from about 5000 to about 100,000. Both the conjugated diolefin polymer arms and the block copolymer arms will be living polymers containing a single lithium atom bonded to a terminal carbon atom. When the asymmetric polymer comprises three arms, the ratio of conjugated diolefin arms to block copolymer arms will be within the range from 2:1 to 1:2 and when the asymmetric radial polymer contains four polymer arms, the ratio of arms containing only conjugated diolefin monomer units to block copolymer arms will be within the range from about 3:1 to about 1:3. In all of the preferred embodiments, any of the known nonpolymerizable coupling agents containing three or four functional groups which are reactive with a lithium carbon bond may be used. In a most preferred embodiment, the coupling agent will be either silicon methyltrichloride or silicon tetrachloride.

In all of the preferred embodiments, when the asymmetric radial polymer is intended to contain more conjugated diolefin polymer arms than block copolymer arms the coupling agent will be contacted first with the conjugated diolefin polymer. When the asymmetric radial polymer is intended to have more block copolymer arms, the coupling agent will first be contacted with the block copolymer. In those preferred embodiments where the number of conjugated diolefin polymer arms and block copolymer arms will be the same the order of contacting is not important.

In all of the preferred embodiments, the sequential coupling reaction will be completed at a temperature within the range from about 50° C. to about 80° C., at a pressure within the range from about 0 psig to about 40 psig and at a nominal holding time within the range from about 1 to about 120 minutes. In the preferred embodiment, stochiometric quantities of the first polymer arm will be used in each step and from stochiometric to a small excess of the second polymer will be used. Orthodimethoxybenzene will be used at a concentration within the range from about 10 to about 1000 ppm as the suitable polar compound in all of the preferred embodiments.

Having thus broadly described the present invention in a preferred, most preferred and still more preferred embodiment thereof, it is believed that the invention will become even more apparent by reference to the following examples. It will be appreciated, however, that the examples are presented solely for purposes of illustration and should not be construed as limiting the invention.

EXAMPLES

EXAMPLE 1

In this example, two asymmetric radial polymers were prepared using the proces of this invention with ethylene glycol diethylether(dioxo). The polymer was prepared using silicon tetrachloride as the coupling agent. The polymer was prepared by first combining a polybutadiene homopolymer having a weight-average molecular weight of 22,000 with silicon tetrachloride at a temperature of 70°-72° C. and a pressure of 20-30 psig. The amount of polybutadiene homopolymer used was sufficient to react with exactly three of the chlorine atoms attached to the silicon tetrachloride. After reaction of the polybutadiene homopolymer and the silicon tetrachloride was substantially complete the reaction product was combined with a 10% excess of a block copolymer and 50 ppm-dioxo based on total solution weight. The block copolymer comprised a single homopolymer block of polybutadiene with 22,000 MW and single polymer block of styrene with 50,000 MW. 10% excess means that a 10% excess of the block copolymer was used over and above that required to react with all of the remaining chlorine groups on the initial silicon tetrachloride. The block copolymer and ether were combined with the reaction product from the first step at a temperature of 70°-72° C. and a pressure of 20-40 psig. During and after reaction of the block copolymer the reaction product was sampled at 10 minutes, 60 minutes and 24 hours to determine the coupling efficiency. By coupling efficiency is meant the amount of block copolymer that actually entered the asymmetric polymer divided by the total amount of block copolymer which was used. Since a 10% excess of block copolymer was used the maximum coupling efficiency that could be realized under error-free metering conditions was 0.91%. The coupling efficiency was determined to be 66.8 at 10 minutes, 68.4 at 60 minutes and 70.9 at 24 hours in the first run and at 73.7, 85.8 and 86.0 at the three times tested respectively in the second run.

EXAMPLE 2

In this example, an asymmetric radial polymer was prepared using the method of this invention with ortho dimethoxybenzene (ODMB) as the ether. The asymmetric radial polymer was prepared by first combining a sufficient amount of a polybutadiene homopolymer, identical to that used in Example 1, sufficient to react with three of the carbon atoms attached to the silicon tetrachloride. After reaction of the polybutadiene homopolymer and silicon tetrachloride was at least substantially complete the reaction product was then combined with a block copolymer identical to that used in Example 1 and 100 parts per million ODMB. The block copolymer and the ether were added to the reaction product at conditions identical to those used in Example 1 and the reaction product was again sampled at 10 minutes, 60 minutes and 24 hours to determine the coupling efficiency at each of these times. Suitable analysis determine that the coupling efficiency was 92.4, 92.7 and 92.7, respectively, at the three times tested.

EXAMPLE 3

In this example, two asymmetric polymers were prepared using the method of this invention in the same manner as is summarized in Example 2 except that 200 parts per million ODMB was substituted for the 100 parts per million ODMB used in Example 2. The coupling efficiency for the two runs, at the time tested, respectively, was determined to be 90.5, 90.7 and 90.8 for the first run and 81.4, 82.1 and 82.6 for the second run.

EXAMPLE 4

In this example, four asymmetric polymers were prepared using polymer and techniques identical to those used in the preceding paragraphs except that no ether was used. This example will, then, provide a basis of comparison between runs completed with ether and runs completed without ether. The coupling efficiencies for the four runs was determined at the three times tested, respectively, as follows: 26.7, 79.1 and 89.6 for run 1; 12.5, 62.6 and 88.0 for run 2; 29.4, 81.7 and 85.3 for run 3 and 44.7, 79.4 and 82.2 for run 4.

For convenience, the result of all of the runs completed in Examples 1-4 is summarized in the following table:

TABLE

| Example No. | Run No. | Coupling Efficiency, % and Time | | |
|---|---|---|---|---|
| | | 10 min. | 60 min. | 24 hrs. |
| 1 | 1 | 66.8 | 68.4 | 70.9 |
| | 2 | 73.7 | 85.8 | 86.0 |
| 2 | | 92.4 | 92.7 | 92.7 |
| 3 | 1 | 90.5 | 90.7 | 90.8 |
| | 2 | 81.4 | 82.1 | 82.6 |
| 4 | 1 | 26.7 | 79.1 | 89.6 |
| | 2 | 12.5 | 62.6 | 88.0 |
| | 3 | 29.4 | 81.7 | 85.3 |
| | 4 | 44.7 | 79.4 | 82.2 |

As will be apparent from a review of the data summarized in the foregoing table, the conversion (coupling efficiency) is significantly better at 10 min. when an ether is used and this is true even when a concentration as low as 50 ppm dioxo was used. The results get closer with and without an ether at 60 min. except when 100 ppm ODMB was used and this suggests an optimum concentration, at least, with ODMB of about 100 ppm. In this regard, it is believed that both concentration and activity effect the result with any given ether and it should be possible to find an optimum concentration of any ether. Relatively low concentrations of ethers are however preferred to minimize undesirable side reactions.

While the present invention has been described and illustrated by reference to particular embodiments thereof, it will be appreciated by those of ordinary skill in the art that the same lends itself to variations not necessarily described or illustrated herein. For this reason, then, reference should be made solely to the attended claims for purposes of determining the true scope of the present invention.

Having thus described and illustrated the invention what is claimed is:

1. In a method for preparing an asymmetric radial polymer comprising the steps of
    (a) contacting a first polymer having a single reactive end group with a nonpolymerizable coupling agent containing a plurality of functional groups which will react with the reactive end group, the amount of said first polymer being substantially stoichiometrically corresponding with a part of the total amount of the functional groups in such a way that the reaction between the first polymer and the coupling agent proceeds substantially to completion,
    (b) contacting in subsequent steps one or more polymers, being different from said first polymer and from each other and having a reactive end group, with the respective reaction product from each proceeding step until all functional groups of the coupling agent have finally completely reacted, and
    (c) recovering an asymmetric radial polymer; the improvement which comprises adding a polar compound capable of increasing the amount of vinyl groups during the polymerization of a conjugated diolefin to the polymer during the final contacting step of the last polymer.

2. The method of claim 1 wherein the coupling agent comprises from 3 to about 12 functional groups.

3. The method of claim 2 wherein said coupling agent contains a number of functional groups selected from the group consisting of 3 and 4.

4. The method of claim 2 wherein said polar compound is selected from the group consisting of ethers, tertiary amines and pyrolidine compounds.

5. The method of claim 2 wherein the polymers used to form the arms are polymers containing only polymerized conjugated diolefins and block copolymers comprising at least one monoalkenyl aromatic hydrocarbon polymer block and at least one conjugated diolefin polymer block.

6. The method of claim 5 wherein said conjugated diolefin arms are a homopolymer of a conjugated diolefin selected from the group consisting of butadiene and isoprene, said monoalkenyl aromatic hydrocarbon is styrene and the conjugated diolefin polymer block is a homopolymer of a conjugated diolefin selected from the group consisting of butadiene and isoprene.

7. The method of claim 6 wherein said first polymer is a living polybutadiene and said second polymer is a living block copolymer comprising at least one polystyrene block and at least one polybutadiene block.

8. The method of claim 6 wherein said first polymer used in step (a) is a homopolymer of isoprene and the polymer used in step (b) is a block copolymer comprising at least one polystyrene block and at least one polyisoprene block.

9. The method of claim 4 wherein said polar compound is an ether.

10. The method of claim 9 wherein said ether is a polyfunctional ether.

11. The method of claim 4 wherein said polar compound is used at a concentration within the range ranging from about 10 to about 1000 ppm for the di- and poly-ethers and amines, and 0.1 to 20% by weight for the mono-ethers.

12. The method of claim 1 wherein the polar compound is orthodimethoxybenzene.

* * * * *